Aug. 6, 1946.  R. SIGNER  2,405,456
METHODS OF AND APPARATUS FOR DIALYTICALLY
SEPARATING MIXTURES OF SUBSTANCES
Filed Oct. 19, 1942  2 Sheets-Sheet 1

Inventor:
Rudolf Signer
by Sommers & Young
Attorneys

Patented Aug. 6, 1946

2,405,456

UNITED STATES PATENT OFFICE 2,405,456

METHODS OF AND APPARATUS FOR DIALYTICALLY SEPARATING MIXTURES OF SUBSTANCES

Rudolf Signer, Gumligen, Bern, Switzerland

Application October 19, 1942, Serial No. 462,658
In Switzerland August 23, 1940

2 Claims. (Cl. 210—8.5)

This invention relates to methods of and apparatus for dialytically separating mixtures of substances.

It is known, that a dialytic cell is provided with two spaces that are separated from each other by a porous partition wall or diaphragm. If in one of the spaces a solvent is contained which includes molecules or ions in dissolved state while in the other space the same solvent but free from admixtures is contained the dissolved substance penetrates through the porous wall into the solvent provided that the pores are of greater size than the molecules. The velocity at which this penetration of substance takes place depends among other things upon the difference in concentration of substance on the two sides of the wall, upon the size and the form of the dissolved molecules and upon the so-called perviousness of the wall. The perviousness is dependent on various factors, for example the number of pores per square centimeter of the wall, the diameter of the pores, the length of the pores, etc.

If the particles are small compared to the diameter of the pores of the diaphragm and if apart from this the particles have a spherical form and are not subjected to abnormal forces acting between them and the material of which the diaphragm is made the velocity of penetration of the particles is approximately inversely proportional to the square root of the mass of the particles.

In addition to the segregation of particles set up in an ordinary dialytic cell from the solution dialysed into the solvent, a second movement of masses takes place in the cell as a result of which the solvent penetrates into the space containing the solution, thereby raising the level of the liquid surface in said space and lowering the liquid level on the other side.

The phenomena described are utilised for the separation of substances for a long time since if it is required to separate component parts, that are colloid-soluble and cannot pass through the diaphragm, from component parts that are susceptible of molecular or ionic dissociation and are readily dialysed. However, the dialysis for the separation of substances of low molecular weight from each other could not be introduced into practice with any amount of success. This has two different causes. In the first place the enriching effect of a single dialytic cell is very small. If two different kinds of particles, having masses $M_1$ and $M_2$ respectively and concentrations $C_1$ and $C_2$, are subjected to dialytic action maximum enriching of the more readily dialysable component part is first obtained on the solvent side of the cell. The two substances yield on the solvent side in small amounts but in a different proportion of concentrations equalling $$\frac{C_1}{C_2} \cdot \sqrt{\frac{M^2}{M^1}}$$

If the dialysis endures for a relatively long time the yield of substance increases on the solvent side more and more, but the enriching effect decreases systematically. The second fundamental difficulty in applying the dialytic principle for the separation of substances of low molecular weights is characterised by this that: maximum enriching is obtained only when extremely small yields are taken into account.

The present invention has for its object a method which eliminates both causes of difficulty in radical manner. It makes possible extensive dialytic separation of mixtures of substances the component parts of which have different coefficients of dialysis.

The liquid solution of the mixture of substances is treated in a plurality of dialytic cells, so that the concentration in each single cell is multiplied. In order to prevent a decrease of the yield in accordance with the potency of the number of cells, the latter are connected to one another in a special manner and the solution is concentrated between two cells.

In order to facilitate the description of the arrangement of the cells, it will be necessary first of all to give some names for the parts of the dialytic cells used. A dialytic cell for continuous use is shown in Fig. 1. The cell I is divided by the membrane 2 in the mixture chamber 3 and the dialysate chamber 4. The solution of the mixture to be separated, the so-called mixture solution, enters the mixture chamber at 5 and leaves it at 6 as the so-called residual solution. The residuum comprises the portions of the mixture which have not passed through the membrane. At 7 the pure solvent enters into the dialysate chamber. It takes up the dialysate through the membrane. At 8 the dialysate solution leaves the dialysate chamber. The mixture solution and the dialysate solution flow in counter-current.

While the mixture solution flows through the mixture chamber, its components pass partly through the membrane into the solvent, which is introduced into the dialysate chamber. When the components possess different dialytic coefficients, a displacement of the relative quantities occurs. The components which dialyse more slowly are slightly enriched in the remainder, while the components which dialyse faster are enriched in the dialysate. In the following "the enrichment of a component" means that due to the dialysis the relative quantity of a component of the mixture is displaced in favor of this component.

The apparatus is so constructed that a solution of the mixture of substances from the first dialytic cell is passed through a series of such cells. Each cell of the series splits up the mixture introduced into its mixture chamber in two fractions, one being the undialysed remainder which contains the components with the lower dialytic coefficient slightly enriched and leaving the mixture chamber. The other fraction is the dialysate which leaves the dialysate chamber and contains the components with the higher dialytic coefficient slightly enriched. The residual solution flows into the mixture chamber of one of the neighboring cells, the dialysate solution into the mixture chamber of the other neighboring cell after having been concentrated. Concentration may be effected by evaporation, crystallization, demixing or some other process which permits to get a highly concentrated solution from a diluted solution.

The method can be carried into effect in apparatus of widely varying constructions.

Figure 1:
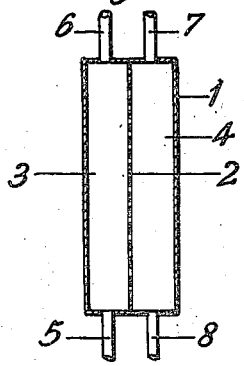
Fig. 1 is a vertical sectional view of a dialytic cell.
Figure 3:
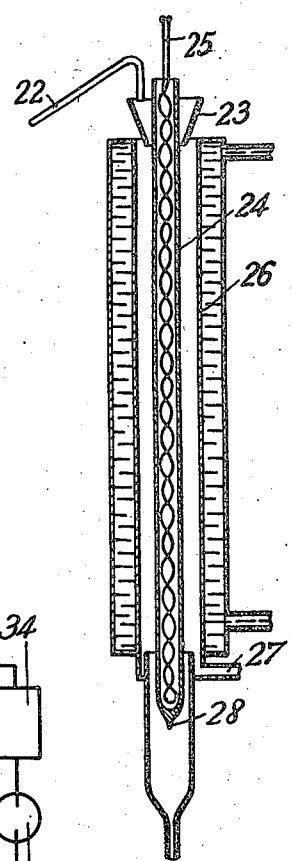
Fig. 3 is a vertical sectional view of one of the evaporators.

The various substances to be separated from each other are contained in a flask 9. The solution to be subjected to dialytic action flows through a siphon 10 into a pump 11, the velocity of flow being regulated by means of a cock valve 12 and continually measured in a measuring instrument 13. The pump 11 supplies the solution to a first evaporator 14 by which the solution is separated in two streams, namely a stream of pure solvent and another of concentrated solution. The construction of the evaporators $14$—$14_{n+1}$ is shown in Fig. 3 in a more detailed manner.

Figure 2:
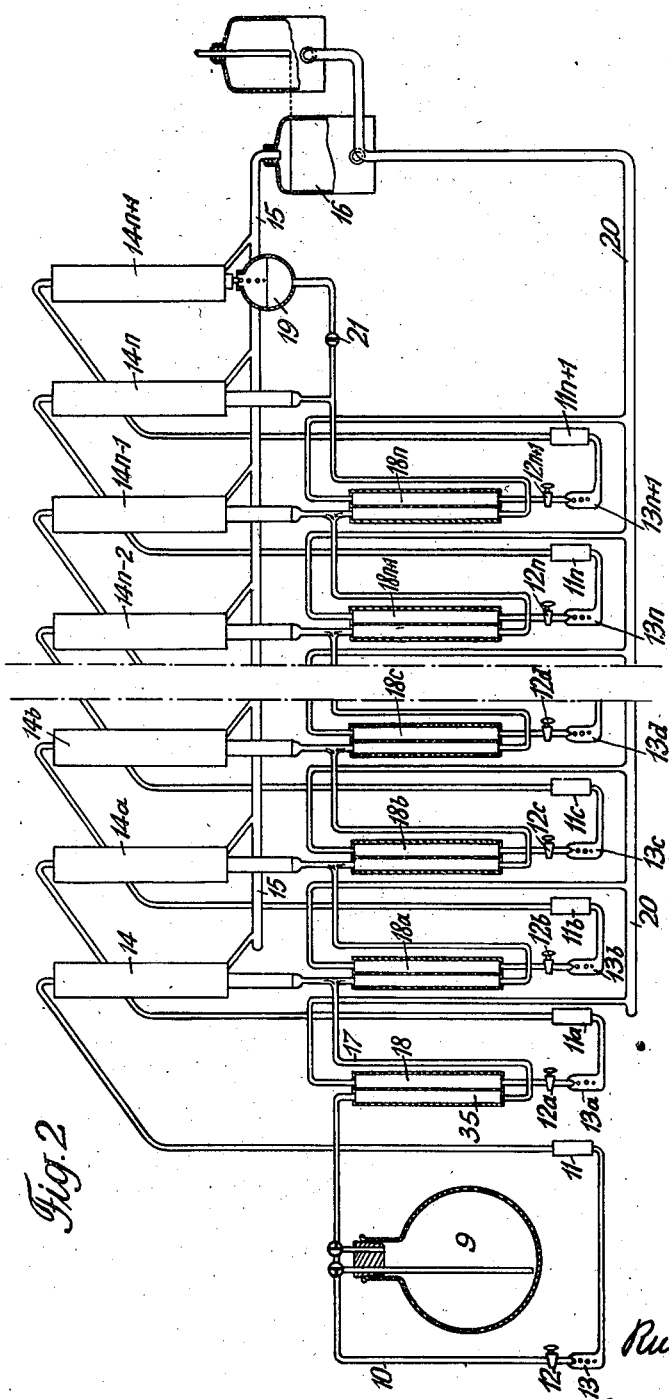
Fig. 2 is a diagrammatic illustration of the system of the apparatus employed in the dialytic separation.

The solution to be concentrated is introduced at 22 and distributed by means of the funnel 23 in such a manner onto the surface of the heating tube 24 which is covered with a glass-tissue, that the solution covers its surface with a thin uniform layer when flowing downwards along the surface of the tube. By the electric heating 25 the solution is evaporated and condensed on the surface 26 cooled with water. The condensate is introduced in the collecting tube 15 (Fig. 2) at 27 and flows then into a storage bottle 16 (Fig. 2).

The concentrated solution drops from the closed pointed end of the heating tube 28 into the pipe 17 (Fig. 2) connecting the mixture chambers of the cells 18a and 18 and flows into the mixture chamber 35.

In that chamber 18 fractionating of the dissolved mixture takes place for the first time. While the solution to be subjected to dialytic action flows in a continuous stream through the mixture chamber it segregates out some part of the components dissolved therein into the solvent flowing through the dialysate chamber of cell 18 across the porous diaphragm. In this fraction, that is the dialysate, the component parts more readily dialysable are enriched, whereas the solution, which flows back from the mixture chamber of the first dialytic cell 18 into the flask 9, contains the more difficultly dialysable component parts in slightly enriched state. This stream contains the not dialysed remainder. The fraction having penetrated through the porous diaphragm of the first dialytic cell into the solvent is subjected to the following treatment:

Since the solvent flows continuously through the dialysate chamber of the cell the dialysed substances are conveyed conjointly with the stream of solvent into the pump 11a and thence into the second evaporator 14a. This evaporator separates part of the solution in solvent and concentrated solution. The former flows through the collecting tube 15 previously mentioned into the reserve bottle 16, whereas the latter passes into the mixture chamber of the second dialytic cell 18a.

In this cell the more readily dialysable component part is again enriched, by partial penetration of the dissolved substances into the dialysate chamber, whereas the component part not dialysed flows back into the first dialytic cell 18. The diluted dialysed product leaving the dialysate chamber of the second dialytic cell 18a passes through the pump 11b into the third evaporator 14b in which it is again concentrated prior to arriving in the third dialytic cell 18b. In the latter the third fractionating of the dissolved substance takes place. The remaining parts of the apparatus operate in like manner as those previously discussed. Each evaporator divides the diluted dialysed product into a solvent portion and a concentrate portion. Each dialytic cell separates the dissolved mixture into two fractions. One of these fractions, which is relatively richer in substances more readily dialysable is conveyed toward a receiving vessel 19 and the other portion including relatively more difficultly dialysable substances is displaced toward the flask 9 containing the starting solution. The solvent chamber of the last dialytic cell $18n$ is connected with the receiving vessel 19, a terminal evaporator $14_{n+1}$ acting to concentrate the respective portion of dialysed product prior to its arrival at the receiving vessel 19. The solvent flowing through the chambers of the various dialytic cells is supplied by the reserve bottle 16 for being distributed by means of a manifold 20. The velocity of flow can be regulated in the various solvent chambers by means of cock valves 12, 12a ... $12_{n+1}$ and measured by means of measuring instruments 13, 13a ... $13_{n+1}$.

In the arrangement of the apparatus described the most readily dialysable products as obtained from the mixture are gathered in the receiving vessel 19, whereas the more difficultly dialysable products remain in the flask 9.

The same apparatus can also be used for separating out of a mixture the most slowly dialysable components while the more readily dialysable components remain in the flask with the starting solution. The procedure for obtaining this result is as follows:

The solution containing the mixture to be separated is introduced into the receiving vessel 19. The dialytic cells and the flasks are filled with pure solvent when the separation begins. The cockvalve 21 is opened so widely that the solution of the mixture flows off at the same rate as it arrives from the evaporator $14_{n+1}$. The volume of the liquid in the receiving vessel remains thus constant. The solution of the mixture passes then through all mixture chambers each after another, whereby nearly the whole mixture, with the exception of a little part of the components being slowly dialysable, pass the diaphragms. The remainder of the solution of the mixture chamber 35 enters into flask 9 where it drives out the solvent escaping through the siphon 10. The concentration of the components to be considered increases in the flask 9 till through siphon 10 the same amount of substance escapes as is introduced from the mixture chamber. From time to time the flask must be discharged and refilled with fresh solvent. In contrary to the process where the component which dialyses most readily shall be separated from the mixture, in this case it is intended to let as much dialysate as possible pass through the diaphragms. This can be realized either by extended surfaces of the diaphragm or by small velocities of the flow in the mixture chambers.

The amounts of substance yielded by the apparatus as well as the enriching effect are dependent upon the velocities of flow on both sides of the diaphragm to a very great extent. It is possible to obtain a large amount of substance of moderate purity or a small amount of substance of a high degree of purity.

The amounts arriving in the receiving vessel in the unit of time are proportional to the degree of concentration in the flask, so that solutions of a degree of concentration as high as possible are dialysable with particular advantage.

Advantageously, the depth of the chambers is made very small. By this means the volume of solution present in the dialyser is kept down. A distance of 0.1 cm. between the back wall of the chamber and the porous diaphragm has proved to be satisfactory. In this case each ccm. of solution is spread over 10 $cm.^2$ of porous diaphragm surface.

Figure 4:
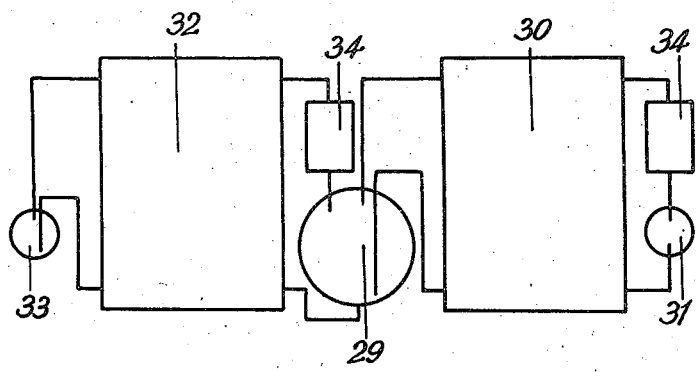
Fig. 4 is a diagrammatic illustration of a modified arrangement of the system for dialytic separation.

It is also possible to combine several individual apparatus in order to collect the slowly dialysable component parts and the more readily dialysable component parts at the same time but in different recipients. Fig. 4 shows in a diagrammatic manner how two apparatus may be combined for this purpose. The flask 29 contains the starting mixture for both apparatus. It is fitted with all connections as shown for flask 9 (Fig. 2) and flask 19 (Fig. 2). In Fig. 4 the combination of the cells and evaporators according to Fig. 2 which collects the more readily dialysable parts in its recipient 31 is numbered 30. 32 is a combination of cells and evaporators according to Fig. 2 which collects the more slowly dialysable component parts in its recipient 33. 34 are the evaporators $14_{n+1}$ according to Fig. 2 which are arranged above the flask 19 of Fig. 2. The mixture introduced into the flask 29 can be entirely separated in its fractions in the recipients 31 and 33. If the flask 29 is fed continuously with fresh mixture, it is possible to draw off from the recipients 31 and 33 continuously two enriched fractions.

The scope of applicability of the method is very great. Any mixture of inorganic or organic nature or combination mixtures of such substances with two or more component parts can be dissociated as long as an appropriate solvent for the mixture is available and the dialysing coefficients of the component parts in the solvent differ from each other. The method can be applied, by way of example, for enriching compounds containing radium or radioactive substances, for dissociating isotopes, for the obtainment of rare earths, for the separation of organic active substances such as hormones, vitamines, etc.

If temperature sensitive components are present which cannot stand the heat set up in the evaporators the method can be carried into effect under vacuum pressure by vacuumizing at the same time the flask, the liquid level control device, the evaporators, the receiving vessel, the reserve liquid tank and other appropriate parts in dependence upon requirements of various constructions of apparatus used.

Mixtures that are sensitive to the influence of oxygen and other substances that may be present in the atmosphere can also be dissociated by the method according to the invention by resorting to an inert gas which is introduced into the apparatus at appropriate points at normal or reduced pressure.

EXAMPLE 1

Arrangement for the separation of the most readily dialysable substance.

Diaphragm surface in each dialytic cell
$cm.^2$__ 350
Number of dialytic cells _____ 5
Rate of flow of solvent _____ccm./min.__ 0.50
Rate of flow of solution _____ccm./min.__ 0.45

Kind and proportionate amount of the substances in the flask: Sodium chloride and sodium sulphate; per 1 gr. NaCl, 1 gr. $Na_2SO_4$ (free from water).

Yield in the receiving vessel per day:
7.115 gr. sodium chloride per 1 gr. in 100 ccm. solution in the flask.
5.163 gr. sodium sulphate per 1 gr. in 100 ccm. solution in the flask.

*Enriching effect*

Number of grams sodium chloride divided by the number of grams sodium sulphate $=\dfrac{7.115}{5.163}=1.38$.

EXAMPLE 2

Arrangement for the separation of the most readily dialysable substance.

Diaphragm surface in each dialytic cell
$cm.^2$__ 350
Number of dialytic cells_____ 5
Rate of flow of solvent_____ccm./min.___ 0.50
Rate of flow of solution_____ccm./min.___ 0.75

Kind and proportionate amount of the substances in the flask: Sodium chloride and sodium sulphate; per 1 gr. NaCl, 1 gr. $Na_2SO_4$ (free from water).

Yield in the receiving vessel per day:
6.662 gr. sodium chloride per 1 gr. in 100 ccm. solution in the flask, 2.532 gr. sodium sulphate per 1 gr. in 100 ccm. solution in the flask.

*Enriching effect*

Number of grams sodium chloride divided by the number of grams sodium sulphate $=\dfrac{6.662}{2.532}=2.63$.

EXAMPLE 3

Arrangement for the separation of the most readily dialysable substance.

Diaphragm surface in each dialytic cell
$cm.^2$__ 350
Number of dialytic cells_____ 5
Rate of flow of solvent_____ccm./min.___ 0.50
Rate of flow of solution_____ccm./min.___ 1.10

Kind and proportionate amount of the substances in the flask: Sodium chloride and sodium sulphate; per 1 gr. NaCl, 1 gr. Na2SO4 (free from water).

Yield in the receiving vessel per day:
 1.950 gr. sodium chloride per 1 gr. in 100 ccm. solution in the flask, 0.486 gr. sodium sulphate per 1 gr. in 100 ccm. solution in the flask.

*Enriching effect*

Number of grams sodium chloride divided by the number of grams sodium sulphate $=\frac{1.950}{0.486}=4.01$.

EXAMPLE 4

Arrangement for the separation of the most readily dialysable substance.

Diaphragm surface in each dialytic cell cm.$^2$__ 350
Number of dialytic cells_____ 5
Rate of flow of solvent_____ccm./min.__ 0.50
Rate of flow of solution_____ccm./min.__ 1.15

Kind and proportionate amount of the substances in the flask: Sodium chloride and sodium sulphate; per 1 gr. NaCl, 1 gr. Na2SO4 (free from water).

Yield in the receiving vessel per day:
 1.498 gr. sodium chloride per 1 gr. in 100 ccm. solution in the flask, 0.282 gr. sodium sulphate per 1 gr. in 100 ccm solution in the flask.

*Enriching effect*

Number of grams sodium chloride divided by the number of grams sodium sulphate $=\frac{1.498}{0.282}=5.31$.

EXAMPLE 5

Arrangement for the separation of the most readily dialysable substance.

Diaphragm surface in each dialytic cell cm.$^2$__ 350
Number of dialytic cells_____ 5
Rate of flow of solvent_____ccm./min.__ 0.50
Rate of flow of solution_____ccm./min.__ 1.45

Kind and proportionate amount of the substances in the flask: Sodium chloride and sodium sulphate; per 1 gr. NaCl, 1 gr. Na2SO4 (free from water).

Yield in the receiving vessel per day:
 0.202 gr. sodium chloride per 1 gr. in 100 ccm. solution in the flask, 0.0059 gr. sodium sulphate per 1 gr. in 100 ccm. solution in the flask.

*Enriching effect*

Number of grams sodium chloride divided by the number of grams sodium sulphate $=\frac{0.202}{0.0059}=34.24$.

EXAMPLE 6

Arrangement for the separation of the most readily dialysable substance.

Diaphragm surface in each dialytic cell cm.$^2$__ 350
Number of dialytic cells_____ 5
Rate of flow of solvent_____ccm./min.__ 1.50
Rate of flow of solution_____ccm./min.__ 0.50

Kind and proportionate amount of the substances in the flask: Sodium chloride and sodium sulphate; per 1 gr. NaCl, 1 gr. Na2SO4 (free from water).

Yield in the receiving vessel per day:
 19.670 gr. sodium chloride per 1 gr. in 100 ccm. solution in the flask, 10.999 gr. sodium sulphate per 1 gr. in 100 ccm. solution in the flask.

*Enriching effect*

Number of grams sodium chloride divided by the number of grams sodium sulphate $=\frac{19.670}{10.999}=1.79$.

EXAMPLE 7

Arrangement for the separation of the most readily dialysable substance.

Diaphragm surface in each dialytic cell cm.$^2$__ 350
Number of dialytic cells_____ 5
Rate of flow of solvent_____ccm./min.__ 1.50
Rate of flow of solution_____ccm./min.__ 1.25

Kind and proportionate amount of the substances in the flask: Sodium chloride and sodium sulphate; per 1 gr. NaCl, 1 gr. Na2SO4 (free from water).

Yield in the receiving vessel per day:
 10.434 gr. sodium chloride per 1 gr. in 100 ccm. solution in the flask,
 1.299 gr. sodium sulphate per 1 gr. in 100 ccm. solution in the flask.

*Enriching effect*

Number of grams sodium chloride divided by the number of grams sodium sulphate $=\frac{10.434}{1.299}=8.03$

EXAMPLE 8

Arrangement for the separation of the most readily dialysable substance.

Diaphragm surface in each dialytic cell cm.$^2$__ 350
Number of dialytic cells_____ 5
Rate of flow of solvent_____ccm./min.__ 1.50
Rate of flow of solution_____ccm./min.__ 1.50

Kind and proportionate amount of the substances in the flask: Sodium chloride and sodium sulphate; per 1 gr. NaCl, 1 gr. Na2SO4 (free from water).

Yield in the receiving vessel per day:
 9.832 gr. sodium chloride per 1 ccm. solution in the flask,
 0.776 gr. sodium sulphate per 1 ccm. solution in the flask.

*Enriching effect*

Number of grams sodium chloride divided by the number of grams sodium sulphate $=\frac{9.832}{0.776}=12.7$.

EXAMPLE 9

Arrangement for the separation of the most readily dialysable substance.

Diaphragm surface in each dialytic cell cm.$^2$__ 350
Number of dialytic cells_____ 5
Rate of flow of solvent_____ccm./min.__ 1.50
Rate of flow of solution_____ccm./min.__ 2.05

Kind and proportionate amount of the substances in the flask: Sodium chloride and sodium sulphate; per 1 gr. NaCl, 1 gr. Na2SO4 (free from water).

Yield in the receiving vessel per day:
  2.708 gr. sodium chloride per 1 gr. in 100 ccm. solution in the flask,
  0.062 gr. sodium sulphate per 1 gr. in 100 ccm. solution in the flask.

*Enriching effect*

Number of grams sodium chloride divided by the number of grams sodium sulphate $=\frac{2.708}{0.062}=43.7$.

Example 10

Arrangement for the separation of the most readily dialysable substance.

Diaphragm surface in each dialytic cell
  cm$^2$__ 350
Number of dialytic cells_____ 5
Rate of flow of solvent_____ccm./min__ 1.50
Rate of flow of solution_____ccm./min__ 2.65

Kind and proportionate amount of the substances in the flask: Sodium chloride and sodium sulphate; per 1 gr. NaCl, 1 gr. Na$_2$SO$_4$ (free from water).

Yield in the receiving vessel per day:
  0.487 gr. sodium chloride per 1 gr. in 100 ccm. solution in the flask,
  0.0077 gr. sodium sulphate per 1 gr. in 100 ccm. solution in the flask.

*Enriching effect*

Number of grams sodium chloride divided by the number of grams sodium sulphate $=\frac{0.487}{0.0077}=63.2$.

Example 11

Arrangement for the separation of the most readily dialysable substance.

Diaphragm surface in each dialytic cell
  cm$^2$__ 700
Number of dialytic cells_____ 5
Rate of flow of solvent_____ccm./min__ 1.50
Rate of flow of solution_____ccm./min__ 1.65

Kind and proportionate amounts of the substances in the flask: Sodium chloride and sodium sulphate; per 1 gr. NaCl, 1 gr. Na$_2$SO$_4$ (free from water).

Yield in the receiving vessel per day:
  10.304 gr. sodium chloride per 1 gr. in 100 ccm. solution in the flask,
  2.844 gr. sodium sulphate per 1 gr. in 100 ccm. solution in the flask.

*Enriching effect*

Number of grams sodium chloride divided by the number of grams sodium sulphate $=\frac{10.304}{2.844}=3.62$.

Example 12

Arrangement for the separation of the most difficultly dialysable substance.

Diaphragm surface in each dialytic cell
  cm$^2$__ 1575
Number of dialytic cells_____ 10
Rate of flow of solvent_____ccm./min___ 1.25
Rate of flow of solution_____ccm./min___ 1.65

Kind and proportionate amounts of the substances in the flask: Sodium sulphate and sodium chloride; per 1 gr. Na$_2$SO$_4$ (free from water), 1 gr. NaCl.

Yield in the receiving vessel per day:
  0.790 gr. sodium sulphate per 1 gr. in 100 ccm. solution in the flask,
  0.038 gr. sodium chloride per 1 gr. in 100 ccm. solution in the flask.

*Enriching effect*

Number of grams of sodium sulphate divided by the number of grams of sodium chloride $=\frac{0.790}{0.038}=20.8$.

Example 13

Arrangement for the separation of the most difficultly dialysable substance.

Diaphragm surface in each dialytic cell
  cm$^2$__ 1575
Number of dialytic cells_____ 10
Rate of flow of solvent_____ccm./min___ 1.25
Rate of flow of solution_____ccm./min___ 2.00

Kind and proportionate amounts of the substances in the flask: Sodium sulphate and sodium chloride; per 1 gr. Na$_2$SO$_4$ (free from water), 1 gr. NaCl.

Yield in the receiving vessel per day:
  2.732 gr. sodium sulphate per 1 gr. in 100 ccm. solution in the flask,
  0.706 gr. sodium chloride per 1 gr. in 100 ccm. solution in the flask.

*Enriching effect*

Number of grams of sodium sulphate divided by the number of grams of sodium chloride $=\frac{2.732}{0.706}=3.87$.

Example 14

Arrangement for the separation of the most difficultly dialysable substance.

Diaphragm surface in each dialytic cell
  cm$^2$__ 1575
Number of dialytic cells_____ 10
Rate of flow of solvent_____ccm./min___ 1.25
Rate of flow of solution_____ccm./min___ 3.05

Kind and proportionate amounts of the substances in the flask: Sodium sulphate and sodium chloride; per 1 gr. Na$_2$SO$_4$ (free from water), 1 gr. NaCl.

Yield in the receiving vessel per day:
  16.765 gr. sodium sulphate per 1 gr. in 100 ccm. solution in the flask,
  14.947 gr. sodium chloride per 1 gr. in 100 ccm. solution in the flask.

*Enriching effect*

Number of grams of sodium sulphate divided by the number of grams of sodium chloride $=\frac{16.765}{14.947}=1.12$.

I claim:

1. The method of dialytically separating a mixture of substances, the first of which has a higher coefficient of dialysis than the second, comprising conducting from an initial body of solution of the mixture a flow of the solution, evaporating the flow of solution into a first relatively concentrated solution and purified solvent, flowing said first concentrated solution across one face of a first dialytic diaphragm while at the same time flowing purified solvent across the other face of said first diaphragm, whereby a relatively greater amount of the first substance of the mixture passes through the first diaphragm to the purified solvent and the solution passing the first side of said first diaphragm retains a relatively greater amount of the second substance, evaporating the solvent containing the relatively greater amount of the first substance into purified solvent and a second relatively concentrated solution containing a higher proportion of the first substance than the initial solution and the first relatively concentrated solution, flowing the said second relatively concentrated solution across one face of a second dialytic diaphragm while at the same time flowing purified solution across the other face of said second diaphragm, evaporating the solvent from said second diaphragm into purified solvent and a third relatively concentrated solution containing a higher proportion of the first substance than either the initial solution or the first or second relatively concentrated solutions, flowing the purified solvent from the last-mentioned evaporation into contact with the said other side of one of the diaphragms, collecting the third relatively concentrated solution containing the higher proportion of the first substance, returning the relatively concentrated solution of substance containing the higher proportion of the second substance from the second dialytic diaphragm to the first side of the first diaphragm, and returning the relatively concentrated solution containing the higher proportion of the second substance from the first dialytic diaphragm to the initial body of solution, whereby said initial body of solution becomes progressively richer in the second substance.

2. In apparatus for separating a mixture of a first and second substance in solution, the first substance having a higher coefficient of dialysis than the second substance, a supply vessel for containing an initial body of the solution, an end product vessel for receiving a solution containing a relatively higher proportion of the first substance, a series of dialytic cells each having a dialytic diaphragm therein dividing the cells into solution sides and solvent sides, a series of evaporation separators for separating a solution into relatively concentrated solution and purified solvent, conduction means for conducting solution from the supply vessel to the first evaporation separator of said series, means for conducting a first relatively concentrated solution from the first separator of said series to the solution side of the diaphragm of the first cell, means for conducting purified solvent from said first separator to the solvent side of the diaphragm of the first cell, means for conducting solvent containing a relatively higher proportion of the first substance from the solvent side of the first cell to an evaporation separator for separating the solvent into purified solvent and a second relatively concentrated solution of relatively higher content of the first substance, conduction means for carrying said second relatively concentrated solution to the solution side of the diaphragm of the second dialytic cell, means for conducting purified solvent across the solvent side of the diaphragm of the second cell, means for conducting solution from the solution side of the second cell to the solution side of the first cell, means conducting solvent from the second cell to a third evaporation separator for separating the solvent into purified solvent and a third relatively concentrated solution of a higher proportion of the first substance, means for collecting the third concentrated solution, and means for returning the purified solvent from the third separator to the solvent side of a dialytic cell diaphragm.

RUDOLF SIGNER.